United States Patent [19]
Dancsik

[11] 3,919,919
[45] Nov. 18, 1975

[54] THREE DIMENSIONAL CUTTING MACHINE WITH PANTOGRAPH CONTROL

[76] Inventor: Joseph J. Dancsik, 15800 Providence Drive, Southfield, Mich. 48075

[22] Filed: Sept. 24, 1974

[21] Appl. No.: 508,841

Related U.S. Application Data

[63] Continuation of Ser. No. 333,905, Feb. 20, 1973, abandoned.

[52] U.S. Cl. .................................. 90/13.1; 33/25 B
[51] Int. Cl.² .......................................... B23C 1/16
[58] Field of Search ............ 90/13.1, 13.2; 33/25 R, 33/25 B

[56] References Cited
UNITED STATES PATENTS

| | | | |
|---|---|---|---|
| 3,085,477 | 4/1963 | Zwick | 90/13.1 |
| 3,289,538 | 12/1966 | Ostler | 90/13.1 |
| 3,417,661 | 12/1968 | Dancsik | 90/13.1 |
| 3,570,368 | 3/1971 | Clark | 90/13.1 |

*Primary Examiner*—Frank T. Yost
*Attorney, Agent, or Firm*—McGlynn and Milton

[57] ABSTRACT

A machine for three dimensional machining of a workpiece by pantograph control to conform the workpiece to a model. The assembly includes a tool holder and tracer assembly which may be moved horizontally along a worktable, horizontally across the worktable, or vertically relative to the worktable by a pantograph parallel beam system, such movements being accommodated by first and second horizontal slide means and a vertical slide means. An important feature of the invention is that the first and second slide means providing lateral horizontal movement and fore and aft horizontal movement relative to a workpiece or a supporting worktable are disposed in vertically spaced horizontal planes one above the other whereby excessive cantilevered positions of the tool and tracer holder is eliminated.

27 Claims, 3 Drawing Figures

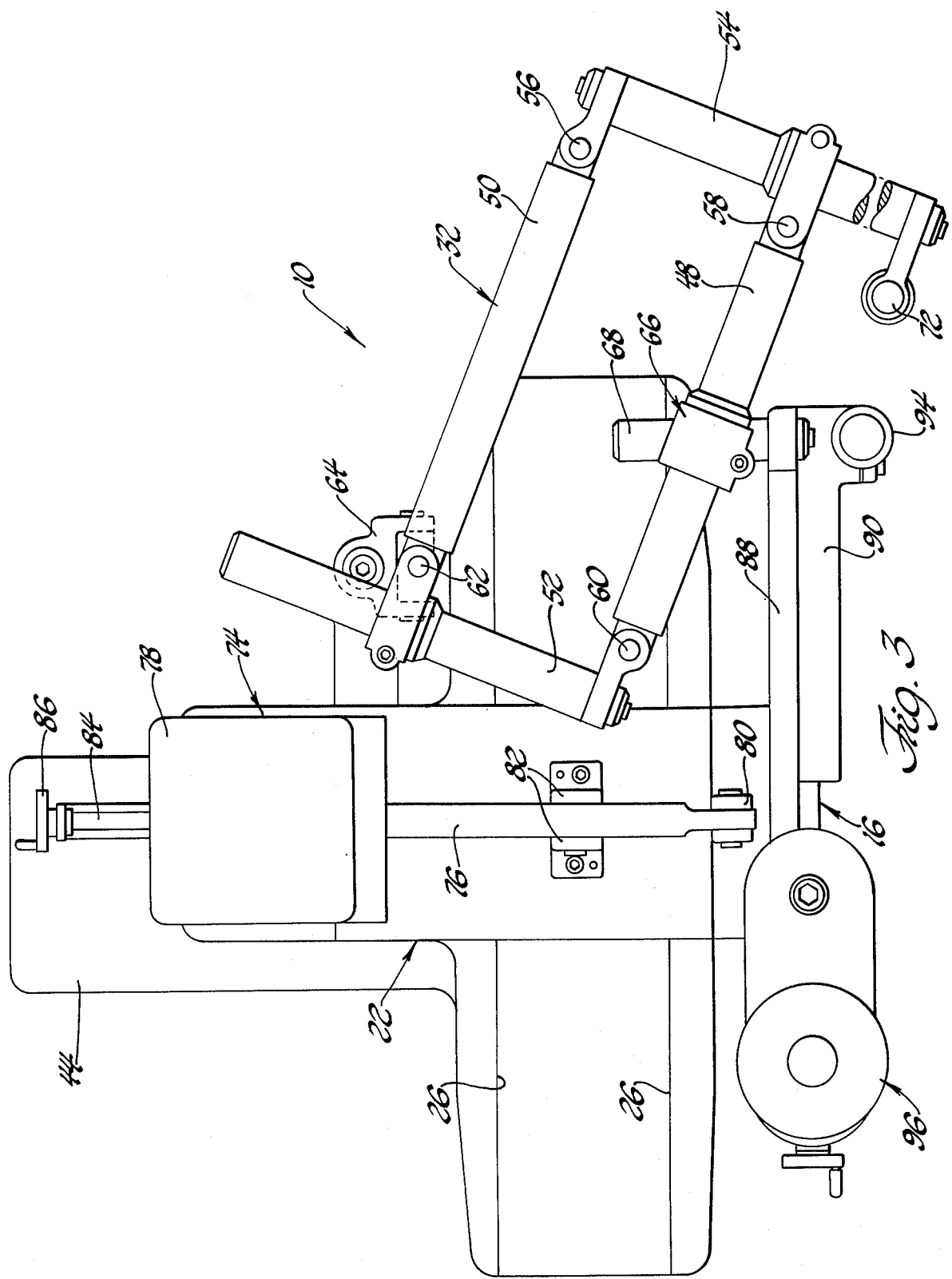

THREE DIMENSIONAL CUTTING MACHINE WITH PANTOGRAPH CONTROL

This application is a continuation of applicant's co-pending application Ser. No. 333,905, filed Feb. 20, 1973, now abandoned.

This assembly relates to a machine which includes a cutting tool and a tracer supported on a tool and tracer holder assembly whereby the tracer may be moved over a model to conform to a model as the cutting tool shapes a workpiece to conform to the configuration of the model. A pantograph structure including first and second pairs of parallel beams forming a parallelogram is utilized to move the tracer and cutter tool in transverse horizontal directions as well as vertically.

A machine of this general type which is well known in the prior art is one wherein the tool and tracer holder assembly is supported on a pair of parallel arms which are in turn pivotally supported at each end to the tool and tracer holder assembly and to a support assembly respectively. In such an assembly, the bearing loads on the pivots can be extremely high as the tool and tracer holder assembly is cantilevered a significant distance from its support where the support arms are pivotally supported.

Another such machine which is known to the prior art is that shown in U.S. Pat. No. 3,417,661. In that assembly, the slideway for providing horizontal fore and aft movement is spaced horizontally in the fore and aft direction from the slide which provides horizontal lateral movement. This arrangement also results in high bearing loads as the tool and tracer holder assemblies are cantilevered a significant distance from the support for the fore and aft horizontal slideway.

Accordingly, it is an object and feature of this invention to provide such a machine including first and second slide means for providing the fore and aft motion and the lateral motion with the first and second slide means being disposed one above the other to minimize the bearing loads resulting from excessive cantilevering of the tool and tracer holder assembly.

In correlation with the foregoing object and feature, other objects and features of this invention are to provide such a machine of improved design and operation as provided by various perfecting structural features.

Other objects and attendant advantages of the present invention will be readily appreciated as the same becomes better understood by reference to the following detailed description when considered in connection with the accompanying drawings wherein:

FIG. 3 is a top view of the assembly without including the workpiece supporting worktable.

Figure 1:
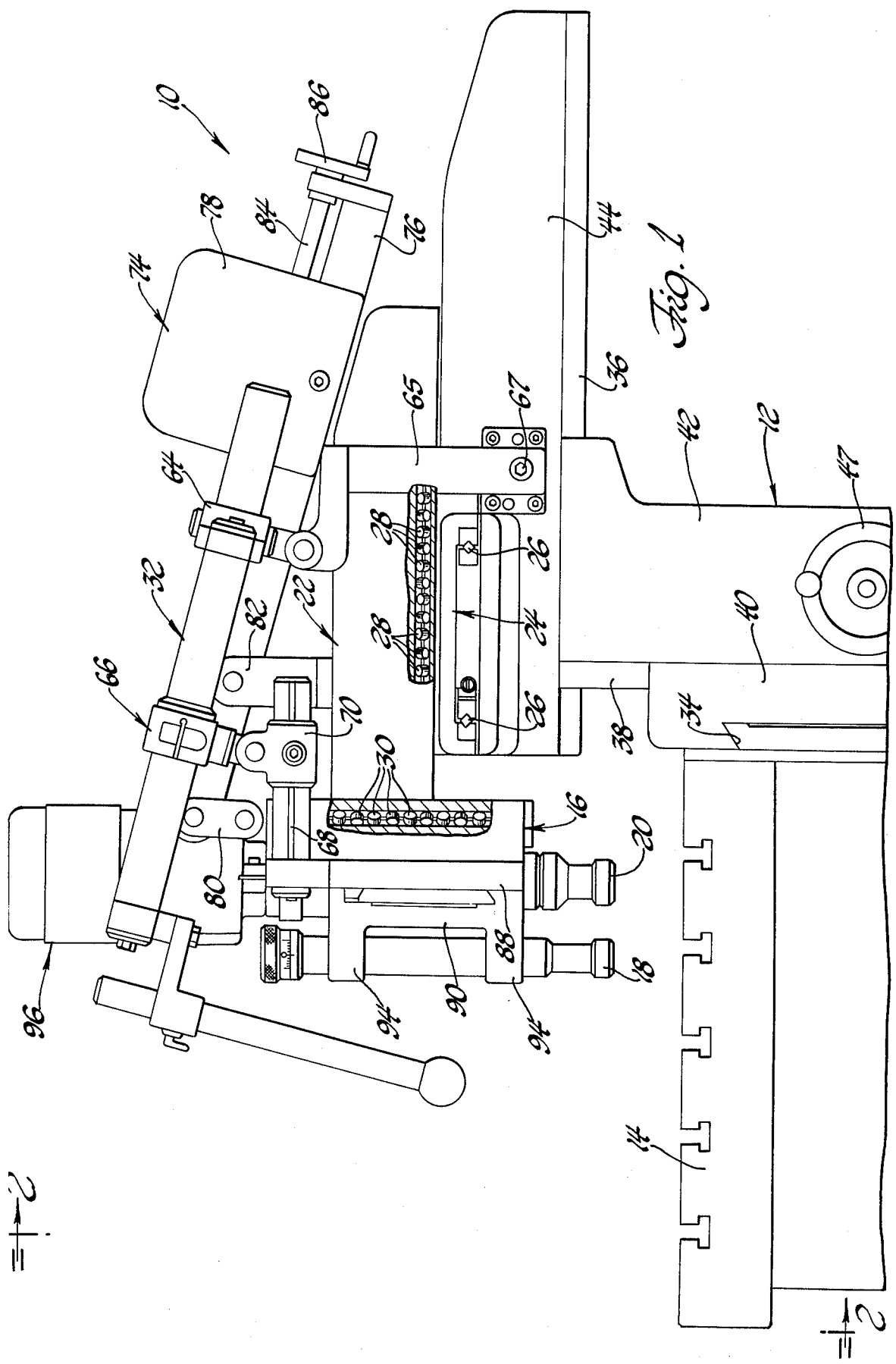
FIG. 1 is a side elevational view partially broken away showing a preferred embodiment of the instant invention.
Figure 2:
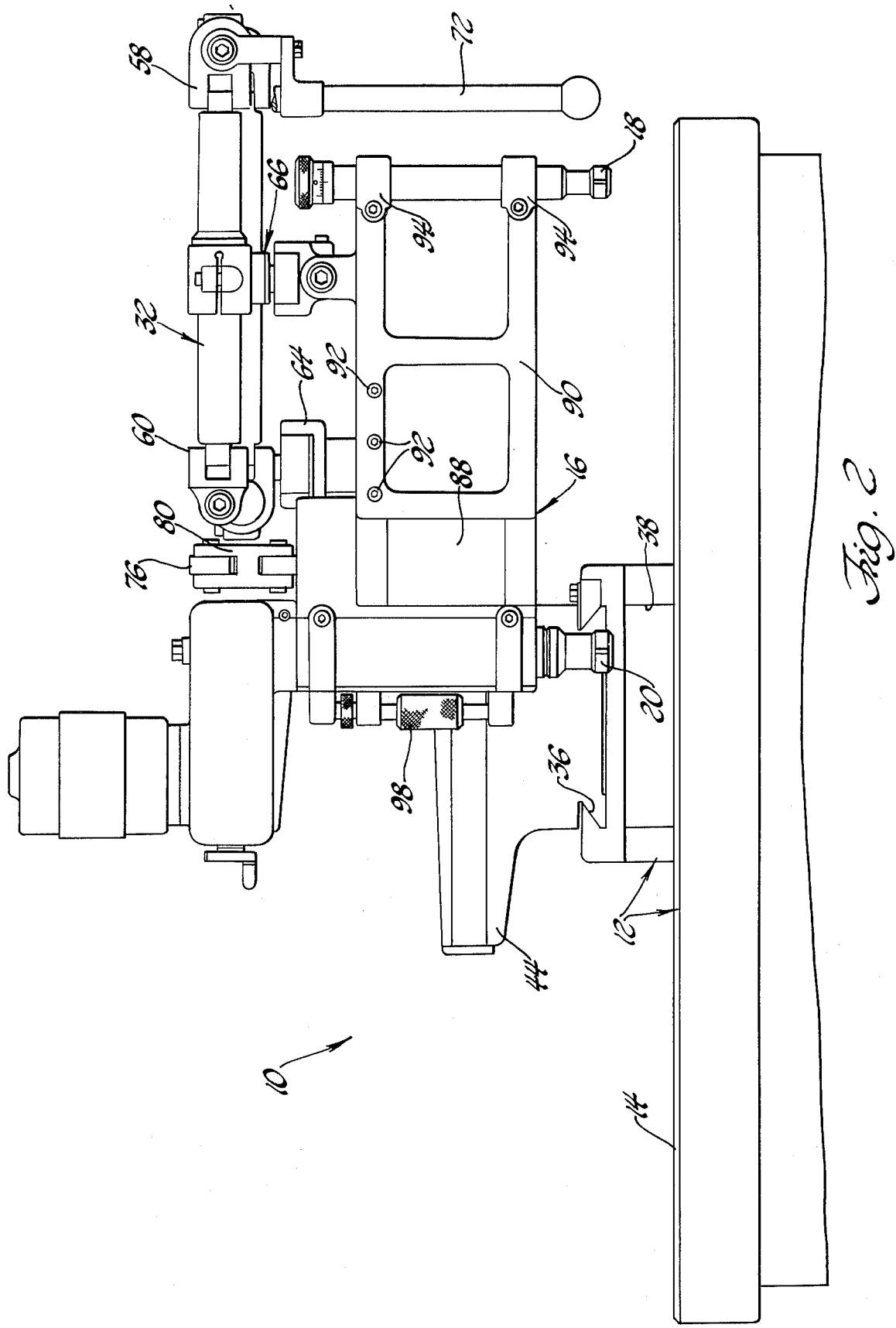
FIG. 2 is a front view taken substantially along line 2—2 of FIG. 1.

A machine for three dimensional machining of a workpiece by pantograph control to conform the workpiece to a model is generally shown at 10.

The machine 10 includes a support means generally indicated at 12. The support means 2 includes the worktable 14 which is utilized to support a model and a workpiece. The table is adapted to rest upon a floor.

The machine 10 includes a tool and tracer holder assembly generally indicated at 16 for supporting a tracer 18 and a cutting tool 20.

The machine also includes a fore and aft slide assembly generally indicated at 22 and a lateral slide assembly generally indicated at 24.

First and second slide means 26 and 28 slidably interconnect support means 12, the fore and aft slide assembly 22, and the lateral slide assembly 24. The first and second slide means 26 and 28 are disposed perpendicular to one another and one above the other, i.e. the slide means 26 and 28 provide horizontal movements which are perpendicular to one another.

There is also included a third slide means 30 slidably connecting the tool and tracer holder assembly 16 to one of the fore and aft and lateral slide assemblies 22 and 24, it being understood that the fore and aft and lateral slide assemblies 22 and 24 could be reversed so that the lateral slide assembly 24 would be above the fore and aft assembly 22. In that arrangement the third slide means 30 would interconnect the tool and tracer holder assembly 16 and the lateral slide assembly 24. The third slide means 30 provides for vertical movement of the tool and tracer holder assembly and is disposed perpendicularly to the first and second slide means 26 and 28, i.e. the vertical movement provided by the vertical slide means 30 is perpendicular to the horizontal movement of the slide means 26 and 28.

The machine also includes pantograph means generally indicated at 32 for moving the tool and tracer holder assembly 16 vertically, laterally, and fore and aft relative to the table 14. The first slide means 26 provides for horizontal movement of the lateral slide assembly 24 along the length of the table 14. The second slide means 28 provides for horizontal movement of the fore and aft slide assembly 22 across or transversely of the table 14.

The first and second slide means 26 and 28 are disposed in first and second horizontal planes which are vertically spaced one above the other. More specifically, each of the slide means 26 and 28 include horizontally spaced slideways and the horizontally spaced slideways of the two respective slide means are disposed in vertically spaced planes one above the other. By such an arrangement, the cantilevered effect of the tool and tracer holder assembly 16 is minimized to thereby reduce the bearing loads on the slide means 26 and 28.

The support means 12 includes adjustment means for providing fore and aft horizontal movement, lateral horizontal movement, and vertical movement of the assemblies 16, 22, and 24 as a unit relative to the table 14, such adjustment means providing for initial setup. More specifically, the adjustment means includes first and second slideways 34 and 36 for providing transverse horizontal movements and a vertical slideway 38 for providing vertical movement of the assemblies 16, 22, and 24 as a unit.

The aadjustment means also includes a first member 40 slidably supported on the table 14 for horizontal movement along the table 14 by the first slideway 34. Also included is a second member 42 slidably supported on the first member 40 for vertical movement relative to the first member 40 by way of the vertical slideway 38. The adjustment means further includes a third member 44 slidably supported on the second member 42 for horizontal movement across the table 14 by the second slideway 36.

A wheel 47 is associated with a screw so that upon rotation of the wheel 47 the lateral position of the first member 40 along the table 14 is adjusted. Similar screw assemblies are associated with the slideways 36 and 38.

The lateral slide assembly 24 is supported on the third member 44 through the first slide means 26 which provides the lateral horizontal movement of the lateral slide assembly 24 relative to the third member 44. The fore and aft slide assembly 22 is supported on the lateral slide assembly 24 through the second slide means 28 for fore and aft horizontal movement of the slide assembly 22 relative to the lateral slide assembly 24. As alluded to above, the tool and tracer holder assembly 6 is supported on the fore and aft slide assembly 22 through the third vertical slide means 30 to provide the vertical movement of the tool and tracer holder assembly.

The pantograph means 32 includes first and second parallel beams 48 and 50 and third and fourth parallel beams 52 and 54. The beams are pivotally interconnected at the pivot connections 56, 58, 60, and 62 to define a parallelogram. A universal joint 64 universally supports the second and third beams 50 and 52 at a position adjacent or at the pivotal connection 62 between the second and third beams 50 and 52. The universal joint 64 is pivotally connected to a bracket 65 which is in turn fastened at 67 to the third member 44 of the support means 12.

Universal means generally indicated at 66 interconnects the first beam 48 and the tool and tracer holder assembly 16, the connection being through a rod 68 and an adjustable collar 70. The portion of the universal means 66 disposed about the first beam 48 may be releasably clamped to the first beam 48 whereby it is adjustable to various positions along the beam 48, such adjustment facilitating the ratio between the size of the model and the configuration cut into the workpiece. The fourth beam 54 extends beyond the pivotal connection 58 thereof to the first beam 48 and a handle 72 is attached to the distal end of the fourthbeam 54. As the handle 72 is manually moved to follow the model with the tracer 18, the cutting tool 20 cuts into the workpiece to conform it to the model being engaged by the tracer 18.

The machine also includes a counterbalancing means generally indicated at 74 for counterbalancing the tool and tracer holder assembly 16 during its vertical movement. The counterbalancing means 74 includes a lever 76 and a counterweight 78. The lever 76 is pivotally attached to the tool and tracer holder assembly 16 by the link 80. The counterweight 78 is disposed upon the lever 76 and is movable therealong. The lever 76 is pivotally supported by a mount 82 on the fore and aft slide assembly 22. There is also included an adjustment means comprising the screw 84 and crank wheel 86 for adjusting the position of the counterweight 78 along the lever 76, which of course changes the amount of counterbalancing applied to the tracer and holder assembly 16.

The tool and holder assembly 16 includes a tool support 88 and an attachment 90 for supporting the tracer 18. The attachment 90 is adjustable in its attachment to the tool support 88 so that it may be attached thereto in various positions to adjust the relative position between the tool 20 and the tracer 18. The attachment 90 is attached to the tool support 88 by fasteners 92. The fasteners 92 are disposed adjacent one end of the attachment 90 and the tracer support or collars 94 are disposed adjacent the other end. The attachment member may be reversed 180°and attached to the tool support 88 so that the tracer support collars 94 may be disposed at either end of the attachment 90 when the attachment 90 is secured to the tool support 88. Of course when this is done, the tracer member 18 must be removed from the collars 94 and inverted relative thereto. By way of this adjustment, various distances may be provided between the tracer 18 and the cutting tool 20.

A motor 96 rotates the cutting tool 20. There is also included a depth control device or adjustment 98 to adjust the depth setting.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are difined as follows:

1. A machine for three-dimensional machining of a workpiece by pantograph control to conform the workpiece to a model, comprising: support means; a fore and aft slide assembly; a lateral slide assembly; a tool and tracer holder assembly; first and second slide means slidably interconnecting said support means, said fore and aft slide assembly and said lateral slide assembly; said first and second slide means being disposed perpendicularly to one another and one directly above the other; third slide means slidably connecting said tool and tracer holder assembly to one of said fore and aft and said lateral slide assemblies; said third slide means being disposed perpendicularly to said first and second slide means; said support means includes adjustment means comprising at least a portion of at least one slideway which may be used for adjusting the position of said assemblies as a unit; and pantograph means for moving said tool and tracer holder assembly.

2. A machine as set forth in claim 1 wherein said first slide means provides for horizontal movement of said lateral slide assembly.

3. A machine as set forth in claim 2 wherein said second slide means provides for horizontal movement of said fore and aft slide assembly.

4. A machine as set forth in claim 3 wherein said third slide means provides for vertical movement of said tool and tracer holder assembly.

5. A machine as set forth in claim 4 wherein said first and second slide means are disposed in first and second horizontal planes which are vertically spaced one above the other.

6. A machine as set forth in claim 5 wherein said pantograph means is pivotally mounted on said support means and is pivotally connected to said tool and tracer holder assembly.

7. A machine as set forth in claim 6 including counterbalancing means for counterbalancing said tool and tracer holder assembly.

8. A machine as set forth in claim 7 wherein said counterbalancing means includes a lever attached to said tool and tracer holder assembly and a counterweight disposed on said lever.

9. A machine as set forth in claim 8 wherein said lever is pivotally supported on one of said fore and aft and said lateral slide assemblies.

10. A machine as set forth in claim 9 wherein said counterbalancing means includes adjustment means for adjusting the position of said counterweight along said lever.

11. A machine as set forth in claim 6 wherein said support means includes a worktable, said tool and tracer holder means being disposed above said worktable.

12. A machine as set forth in claim 11 wherein said adjustment means includes a plurality of slideways for providing fore and aft horizontal movement, lateral horizontal movement and vertical movement of said assemblies as a unit relative to said table.

13. A machine as set forth in claim 12 wherein said adjustment means includes first and second slideways for providing transverse horizontal movements and a vertical slideway for providing vertical movement.

14. A machine as set forth in claim 13 wherein said adjustment means includes a first member slidably supported on said worktable for horizontal movement along said worktable by said first slideway, a second member slidably supported on said first member for vertical movement relative to said first member by said vertical slideway, and a third member slidably supported on said second member for horizontal movement across said worktable by said second slideway.

15. A machine as set forth in claim 14 wherein said lateral slide assembly is supported on said third member through said first slide means for said lateral horizontal movement relative thereto.

16. A machine as set forth in claim 15 wherein said fore and aft slide assembly is supported on said lateral slide assembly through said second slide means for said fore and aft horizontal movement relative thereto.

17. A machine as set forth in claim 16 wherein said tool and tracer holder assembly is supported on said fore and aft slide assembly through said third slide means for said vertical movement relative thereto.

18. A machine as set forth in claim 17 wherein said pantograph means includes first and second parallel beams and third and forth parallel beams, said beams being pivotally interconnected to define a parallelogram, said beams being universally supported at a position adjacent the pivotal connection between said second and third beams, universal means operatively interconnecting said first beam and said tool and tracer holder assembly, said universal means being adjustable to various positions along said first beam, said fourth beam extending beyond the pivotal connection thereof to said first beam, and a handle attached to the distal end of said fourth beam.

19. A machine as set forth in claim 18 including counterbalancing means for counterbalancing said tool and tracer holder assembly.

20. A machine as set forth in claim 19 wherein said counterbalancing means includes a lever attached to said tool and tracer holder assembly and a counterweight disposed on said lever.

21. A machine as set forth in claim 20 wherein said lever is pivotally supported on said fore and aft slide assembly.

22. A machine as set forth in claim 21 wherein said counterbalancing means includes adjustment means for adjusting the position of said counterweight along said lever.

23. A machine as set forth in claim 22 wherein said tool and tracer holder assembly includes a tool support and an attachment for supporting said tracer.

24. A machine as set forth in claim 23 wherein said attachment is attachable to said tool support in various positions to adjust the position between the tool and the tracer.

25. A machine as set forth in claim 1 wherein said tool and tracer holder assembly includes a tool support and an attachment for supporting said tracer.

26. A machine as set forth in claim 25 wherein said attachment is attachable to said tool support in various positions to adjust the position between the tool and the tracer.

27. A machine as set forthin claim 26 wherein said attachment includes means for attachment to said tool support adjacent one end and a tracer support at the other end, said attachment being reversibly attachable to said tool support so that said tracer support may be disposed at either end of said attachment when secures to said tool support.

\* \* \* \* \*